(No Model.)
R. H. SMITH.
PIPE JOINT.
No. 269,334. Patented Dec. 19, 1882.
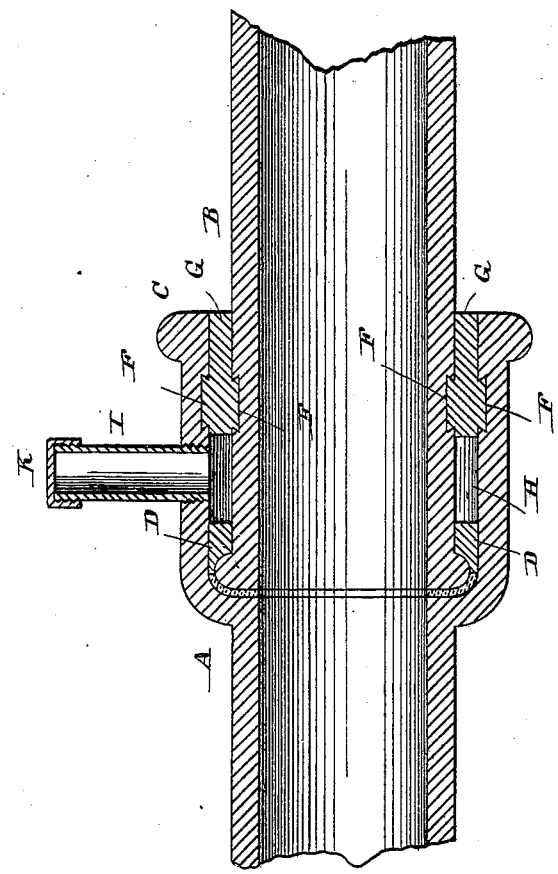
Witnesses.
Edwin L. Jewee.
N. A. Toulmin
Inventor:
Roland H. Smith
By C. M. Alexander.
Attorney

UNITED STATES PATENT OFFICE.

ROLAND H. SMITH, OF PITTSBURG, PENNSYLVANIA.

PIPE-JOINT.

SPECIFICATION forming part of Letters Patent No. 269,334, dated December 19, 1882.

Application filed June 14, 1882. (No model.)

*To all whom it may concern:*

Be it known that I, ROLAND H. SMITH, of Pittsburg, in the county of Allegheny, and in the State of Pennsylvania, have invented certain new and useful Improvements in Pipe-Joints; and I do hereby declare that the following is a full, clear, and exact description thereof, reference being had to the accompanying drawing, and to the letters of reference marked thereon, making a part of this specification.

This invention relates to certain improvements in pipe-joints for gas and water mains; and it has for its objects to provide a joint so constructed that it will automatically tend to secure itself, and to provide a means for determining and testing the tightness of the joint, as more fully hereinafter specified. These objects I attain by the means illustrated in the accompanying drawing, which illustrates a longitudinal sectional view of my invention.

In the said drawing, the letter A indicates one section of a gas or water main, and B another section thereof. The section A is formed with an enlarged mouth, C, as usual, for the reception of the flanged or beaded end of the other section.

The letter D indicates a gasket or annulus, of soft metal, such as lead or the like, which is cast around the beaded end of the main just back of the bead by means of a suitable mold. The beaded or flanged end of the pipe, as thus constructed with the soft-metal gasket or annulus cast around it, is then placed in the enlarged end of the opposite section, a packing of oakum or other suitable material being placed between the beaded end of the one pipe-section and the shoulder of the enlarged end of the other. The metallic gasket or annulus is then tamped or calked tight in the usual manner. The two sections of the pipes are then luted with clay, in the usual manner, at each side of the undercut annular recesses F, and soft metal poured in in the usual manner, forming a filling, G, which may be afterward tamped or calked to insure the tightness of the joint. The space H between the two metallic gaskets or packings has leading to it a vertical pipe-section, I, leading to the surface of the street, which is covered with a screw-cap, K, as indicated. The space between the gaskets, as above mentioned, is intended to be filled with some suitable liquid, which will indicate by its fall any imperfection in the joint at either gasket, and thereby any leakage. The space and connecting-pipe also forms a means for determining the security of the joint at either gasket initially by means of an air-pump that will either exhaust or force air into the space, and thus test the tightness of the connections. The annular recesses in the respective pipes are formed with undercut or beveled edges, and the packing when cast therein, on cooling, contracts, so as to bind the edges securely in the recesses, thus automatically tightening the joint.

Having thus described my invention, what I claim, and desire to secure by Letters Patent, is—

1. In combination with the pipe-sections, provided with undercut recesses, the metallic packing cast, contracted, and tamped therein, substantially as specified.

2. The combination, with the two sections of a gas or water main, constructed as described, of the metallic gaskets or packings, leaving an interposed space, and the pipe-section leading therefrom, substantially as and for the purposes specified.

In testimony whereof I affix my signature in presence of two witnesses this 22d day of May, 1882.

ROLAND H. SMITH.

Witnesses:
W. M. GORMLY,
W. J. FAWCETT.